United States Patent [19]

Muhlbauer et al.

[11] 3,761,757
[45] Sept. 25, 1973

[54] INFRARED LAMP WITH SILICON BULB

[75] Inventors: Alfred Muhlbauer, Munchen; Hans Nagorsen, Berlin, both of Germany

[73] Assignee: Siemens Aktiengesellschaft, Munich and Erlangen, Germany

[22] Filed: Dec. 8, 1971

[21] Appl. No.: 205,799

[30] Foreign Application Priority Data

Dec. 10, 1970  Germany............... P 20 60 839.3

[52] U.S. Cl............. 313/110, 117/97, 117/116 A, 313/117
[51] Int. Cl.......................... H01j 5/16, H01j 61/38
[58] Field of Search................ 313/110, 112, 117; 117/97, 106 A; 106/47 Q

[56] References Cited
UNITED STATES PATENTS 3,225,242  12/1965  Regelson............... 313/110
2,898,498  8/1959  Philips................... 313/110 X
3,368,712  2/1968  Sanford et al........... 117/97 X
3,669,769  6/1972  Badami et al........... 117/106 A X
3,428,500  2/1969  Maeda.................. 117/106 A X

*Primary Examiner*—Alfred L. Brody
*Attorney*—Arthur E. Wilfond et al.

[57] ABSTRACT

In an infrared lamp instead of a glass or quartz bulb, a tube sealed at one end and consisting of pyrolytically precipitated, polycrystalline silicon is used. It is gastight even at a wall thickness of 0.5 mm and mechanically stable even at elevated temperatures, up to 1,300° C. Silicon possesses a distinct filter effect and is permeable only to beams with a wave length greater than 1.1 $\mu$.

3 Claims, 1 Drawing Figure

PATENTED SEP 25 1973　　　　　　　　　　3,761,757
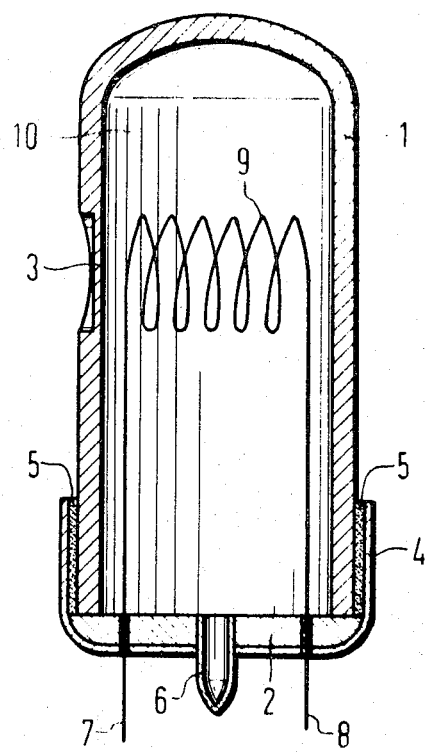
INVENTOR
BY

INFRARED LAMP WITH SILICON BULB

The present invention relates to an infrared lamp comprising a lamp base and a bulb in gas tight connection therewith and a lamp filament inside the bulb.

Previously known infrared lamps have a bulb of colored glass or quartz. It is also known to use incandescent lamps whose bulbs are of uncolored glass or quartz and to connect ahead of these an infrared filter of colored glass. Glass bulbs and glass filters are mechanically not very stable and, furthermore, do not tolerate very high temperatures. It is also difficult to produce glass filters with distinct filter characteristics, particularly for long wave infrared.

The object of the invention is to provide an infrared lamp of the afore-mentioned type wherein the disadvantages of the conventional infrared lamps are avoided. The bulb consists, at least partially, of silicon.

The bulb, preferably, consists of a tube, closed at one end, of polycrystalline silicon which is preferably pyrolytically precipitated. The tube may have a wall thickness between 0.5 and 4 mm and a diameter between 20 and 60 mm. At least one portion thereof may have a thinner wall than the remaining tube.

The invention will be disclosed in greater detail with reference, as illustrated in the Drawing.

The infrared lamp has a bulb 1 consisting of a silicon tube whose lower end is open. The opening is sealed by a bottom 2. The bottom 2 may either consist of silicon or of glass or quartz. The bottom 2 and the lower end of the bulb 1 are enclosed by a cup-shaped base 4, e.g., of quartz or glass. The lower portion of the bulb 1 and the base 4 are sealed by means of a heat resistant sealing mass 5, such as a silicone adhesive. A glass tube 6 leads through the bottom 2 and the base 4. The interior 10 of the infrared lamp may be evacuated or filled with protective gas through tube 6. After evacuation or filling, with protective gas, the tube 6 is fused shut. Two terminals 7 and 8 which pass through the bottom 2 and the base 4 are connected with a helical coil 9 in the interior 10 of the infrared lamp. The coil 9 may be of silicon, silicon carbide or tungsten. The bushings in the bottom 2 and in the base 4 through which terminals 7 and 8 are guided, are sealed, for example, by melting together with the base and/or the bottom. A location of lesser thickness is also provided in the bulb 1, which will be called "window" in the following text. The window 3 is positioned on the same level as the coil 9.

When the coil 9 is heated by a voltage applied to terminals 7 and 8, it continually irradiates the entire light spectrum from the long wave infrared up to ultraviolet. The bulb 1, filters out the ultraviolet, the visible light and the short wave infrared, so that only the long wave infrared, at a wave length in excess of $1.1\mu$, can pass through.

At a given capacity, of the coil, the intensity of the radiation passed depends on the thickness of the silicon layer of the bulb 1. The layer thickness is, preferably, between 0.5 and 5 mm. At a layer thickness of 0.5 mm, the bulb 1 is already gas-tight. It is not recommended to select a wall thickness over 4 mm, since thicker walls are difficult to produce and because of the greater material requirement, the bulb 1 becomes too expensive. The diameter of the bulb 1 may be between 20 and 60 mm.

Since the wall thickness is slighter at this location, the infrared beam passes through the window 3 with a higher intensity than in the remaining localities of the piston. The window 3, however, is not necessary or it may be situated at another location, for example, as the surface of the bulb 1.

As previously mentioned, the bulb 1 consists of pyrolytically precipitated, polycrystalline silicon. This material and the technology of its production are well known from the semiconductor art. An explanation of the production of bulb 1 is therefore limited to what is absolutely necessary in connection with the present invention.

In a reaction vessel of quartz, which is closed against the outside atmosphere, a tubular, heatable carrier body is positioned, for example, of graphite and is closed on one end. The carrier body may be heated, e.g., through a direct current flow or a coil traversed by high frequency current, to a temperature between 1,000° and 1,300° C. The reaction vessel has an inlet opening through which a mixture of hydrogen and a gaseous compound of the semiconductor material, e.g., trichlorosilane $SiHCl_3$ passed. The gas mixture may have a mole weight ratio between hydrogen and trichlorosilane of about 1:0.5 to 1:0.005. The flow rate of the gas mixture may be between 0.95 and 5 liter/hcm² of the surface to be precipitated.

The mixture reacts at a temperature of about 1,000° to 1,300° C on the surface of the heated carrier body, so that polycrystalline silicon preciptates thereon. The gas mixture residue which does not react with formation of silicon, escapes through an outlet opening. When a sufficiently thick layer of silicon, e.g., 0.5 to 4 mm is precipitated, the precipitation process is stopped and the carrier body may be removed from the reaction vessel comprising the unilaterally sealed tube. Since the graphite of the carrier body has a higher thermal expansion coefficient than the silicon, it shrinks more during cooling and may be pulled out of the silicon tube. The bulb for the infrared lamp is thus finished. The window 3 in bulb 1 may either be produced through mechanical processing or, also, through the fact that when a certain layer thickness is obtained, no more semiconductor material will be precipitated upon the area corresponding to the window. This may be done by mounting a bent metal disc at the window location.

The bulb of the infrared lamp must not, necessarily, consist completely of silicon but may also be partly of another material, e.g., molybdenum. However, silicon is always provided at those places where the emission of the infrared radiation is desired.

What is claimed is:

1. In an infrared lamp assembly including a tube substantially comprised of polycrystalline silicon in the shape of a bulb open at one end and provided with a silicon layer thereon; means disposed at said open end to form a closure therewith; base means enclosing said closure means to thereby form a positive seal between the end of said bulb and said closure means; conduit means extending into the interior of said bulb for evacuating said bulb; coil means disposed interior of said bulb provided with a pair of terminals extending through said base means for energizing said coil; and a window means formed along a surface portion of said bulb, for passing an infrared beam therethrough.

2. The infrared lamp as claimed in claim 1, wherein said bulb has a wall thickness of from 0.5 to 4 mm and a diameter of from 20 to 60 mm.

3. The infrared lamp as claimed in claim 2, wherein at least one portion of said bulb is provided with a wall section thinner than the remainder of said bulb.

* * * * *